United States Patent
Hoehne (10) Patent No.: US 9,804,764 B2
(45) Date of Patent: Oct. 31, 2017

(54) METHOD AND DEVICE FOR DISPLAYING INFORMATION ARRANGED IN LISTS

(75) Inventor: Sven Hoehne, Gifhorn (DE)

(73) Assignee: VOLKSWAGEN AG, Wolfsburg (DE)

( * ) Notice: Subject to any disclaimer, the term of this patent is extended or adjusted under 35 U.S.C. 154(b) by 444 days.

(21) Appl. No.: 13/125,175

(22) PCT Filed: Aug. 6, 2009

(86) PCT No.: PCT/EP2009/060249
§ 371 (c)(1),
(2), (4) Date: Jul. 15, 2011

(87) PCT Pub. No.: WO2010/046147
PCT Pub. Date: Apr. 29, 2010

(65) Prior Publication Data
US 2011/0265036 A1 Oct. 27, 2011

(30) Foreign Application Priority Data
Oct. 21, 2008 (DE) .................. 10 2008 052 485

(51) Int. Cl.
*G06F 3/0482* (2013.01)
*G06F 3/0488* (2013.01)
(Continued)

(52) U.S. Cl.
CPC ............ *G06F 3/0488* (2013.01); *B60K 35/00* (2013.01); *B60K 37/06* (2013.01); *G06F 3/0482* (2013.01);
(Continued)

(58) Field of Classification Search
CPC ............................ G06F 19/322; G06F 3/0488
(Continued)

(56) References Cited

U.S. PATENT DOCUMENTS

| 6,769,320 B1 | 8/2004 | Bollgohn et al. |
| 7,225,101 B2 * | 5/2007 | Usuda et al. ................. 702/141 |

(Continued)

FOREIGN PATENT DOCUMENTS

| DE | 103 05 341 | 8/2004 |
| DE | 10 2004 048 956 | 4/2006 |

(Continued)

OTHER PUBLICATIONS

International Search Report, issued in corresponding International Application No. PCT/EP2009/060249.
(Continued)

*Primary Examiner* — Jennifer To
*Assistant Examiner* — Ashley Fortino
(74) *Attorney, Agent, or Firm* — Andrews Kurth Kenyon LLP (57) ABSTRACT

In a method for displaying information, a portion of a list is displayed on a display area, which includes a plurality of list entries, and the displayed portion of the list is changed by a first operator action of a user, the entries of the list being run through consecutively by the first operator action. By a second operator action multiple list entries are skipped so as to reach a list entry that is not contained in the displayed portion of the list entries that were displayed while performing the second operator action. In a device for displaying information, the above method steps are implementable.

9 Claims, 6 Drawing Sheets

(51) Int. Cl.
  *B60K 35/00* (2006.01)
  *B60K 37/06* (2006.01)
(52) U.S. Cl.
  CPC ............ *B60K 2350/1024* (2013.01); *B60K 2350/1028* (2013.01)
(58) Field of Classification Search
  USPC .................................................. 715/810
  See application file for complete search history.

(56) References Cited

U.S. PATENT DOCUMENTS

| | | | |
|---|---|---|---|
| 7,269,002 | B1 | 9/2007 | Turner et al. |
| 2003/0048309 | A1 | 3/2003 | Tambata et al. |
| 2005/0071118 | A1 | 3/2005 | Usuda et al. |
| 2006/0048076 | A1* | 3/2006 | Vronay ............... G06F 3/0482 715/850 |
| 2006/0066588 | A1 | 3/2006 | Lyon et al. |
| 2007/0028268 | A1 | 2/2007 | Ostojic et al. |
| 2007/0028270 | A1* | 2/2007 | Ostojic et al. ................. 725/53 |
| 2007/0083911 | A1 | 4/2007 | Madden et al. |
| 2008/0168404 | A1 | 7/2008 | Ording |
| 2008/0174562 | A1 | 7/2008 | Kim |
| 2010/0001960 | A1* | 1/2010 | Williams ...................... 345/173 |
| 2010/0175026 | A1* | 7/2010 | Bortner ............... G06F 3/0481 715/818 |

FOREIGN PATENT DOCUMENTS

| | | |
|---|---|---|
| EP | 1 212 208 | 6/2002 |
| GB | 2 434 068 | 7/2007 |
| JP | 2008135075 A | 6/2008 |
| KR | 20060017772 A | 2/2006 |
| KR | 20080028962 A | 4/2008 |
| KR | 20080068781 A | 7/2008 |
| WO | 2004/023283 A1 | 3/2004 |
| WO | 2004104815 A2 | 12/2004 |

OTHER PUBLICATIONS http://manuals.info.apple.com/de_DE/iPod_touch_2.1_Benutzerhandbuch.pdf, "iPod touch Benutzerhandbuch (with iPhone 2.1 Software)," Apple, Inc., pp. 15-45 and 134 (Sep. 2008).
"CubeDesktop User Manual" Version 1.3, Mar. 2008.
Korean Office Action issued in corresponding Korean Patent Application No. 10-2011-7009401, dated Feb. 17, 2015.
Russian Office Action issued in corresponding Russian Patent Application No. 2011120464, dated Jun. 22, 2012.

* cited by examiner

METHOD AND DEVICE FOR DISPLAYING INFORMATION ARRANGED IN LISTS

FIELD OF THE INVENTION

The present invention relates to a method for displaying information, in which a portion of a list is displayed on a display area, which includes a plurality of list entries. The displayed portion of the list is changed by a first operator action of a user, the first operator action running consecutively through the entries of the list. The present invention furthermore relates to a device for displaying information including a display device having a display area, a memory for storing a list, which includes a plurality of list entries, of which a portion is displayable on the display area, and an operating device, which is operable by a user, in order to change the displayed portion of the list by a first operator action, the first operator action running consecutively through the entries of the list.

BACKGROUND INFORMATION

Mobile devices in consumer electronics such as e.g. devices for playing back audio and/or video files have memories, in which very large amounts of data may be stored. Mobile music players, for example, are able to store several thousands of musical pieces. In such mobile devices there arises the problem of how the user is able to access these large amounts of data in a simple manner. For navigation, the mobile devices often have a display and an operating device. The operating device may include a touch-sensitive surface of the display or may be an operating element that is separate from the display. The data sets stored in the device may be stored at least in part as a list, of which a portion may be displayed on the display. With the aid of the operating device, the user is able to scroll through the list in order to reach the desired list entry. If the list contains very many entries, however, there arises the problem that it takes very long to reach an entry that is arranged in the list very far away from the displayed list entries. For this reason it has been proposed to group the list entries hierarchically. This entails the disadvantage, however, that the user must navigate through a deeply branched hierarchical menu structure in order to arrive at a desired list entry.

Furthermore, the display of information in a vehicle also entails the problem that very large data sets must be visualized in the vehicle. Modern vehicles include for example a plurality of driver assistance systems, the information of which must be displayed in the vehicle. Furthermore, vehicles often include a navigation system. Such a navigation system is able to display digital geographic road maps including a route and possibly various additional information. Finally, modern vehicles often include communication and multimedia applications, including a mobile telephone interface and devices for playing back music and voice. For these applications it must also be possible to display information in the vehicle. The display of information in a vehicle and the operation of the manifold devices of the vehicle entail very specific requirements. In the vehicle, it is, among others, the driver who takes in the information and operates the respective device. The information should thus be represented in the vehicle in such a way that while taking in the information the driver is not distracted from driving. The represented information should therefore be ascertainable intuitively and quickly by the driver such that he has to take his eyes off the driving action only very briefly when taking in the information. Likewise, the operation of the vehicle devices should be as simple and intuitive as possible such that the driver is able to operate the devices even while driving. If the operation is supported or guided by a display, then the display should occur in such a way that the driver has to view the display only very briefly in order to carry out the operation.

The representation of information in a vehicle often occurs in that a portion of the total information is displayed on the display area in the vehicle and that the user is able to change the portion. The total information may be a list having a plurality of list entries for example. A portion of the entries of the entire list is displayed. By an operator action, the user is able to scroll so as to display other list entries. In the operator action, the user may perform for example an operator movement of a certain extent. The user may furthermore actuate an operating element for a certain operating duration. The quantity or the measure of the change of the displayed information, i.e. in this case the number of items, by which the displayed list entries change, depends in this case on the extent of the operator movement or on the operating duration.

If a very long list having many entries is to be accessed in the vehicle, there exists the problem that the operator action for scrolling to very distant list entries requires much time and attention on the part of the user. In the application in a vehicle, however, this is disadvantageous, as explained above.

SUMMARY

Example embodiments of the present invention provide a method and a device of the type mentioned at the outset, by which the displayed portion of the list may be changed in a manner that is simple and intuitive for the user such that the operator action required for this purpose may be performed as quickly as possible. Furthermore, as little attention as possible is to be exacted from the user.

In the method according to example embodiments of the present invention, by a second operator action, multiple list entries are skipped so as to reach a list entry that is not contained in the displayed portion of the list entries that were displayed while performing the second operator action.

A list should be understood as a data set that is divisible into a plurality of data units. The data units then correspond to the list entries. The data units may be brought into a certain sequence such that they then represent a list. By the first operator action, the user is able to run through the entries of the list consecutively. For this purpose, a portion of the list, i.e. multiple list entries, may be represented on the display area on the basis of a graphic object.

The list may include a plurality of audio or video files for example. Furthermore, it may pertain to entries of a telephone or address book, entries of a menu of a hierarchical menu structure for operating a device or other data units, which may be integrated in a list and represented abstractly on the basis of a graphic object.

Using the second operator action, which the method described herein makes possible, the list may be scanned much more quickly in order to reach a desired list entry since it is not necessary to run through the entire list entry by entry before reaching the desired entry, as the second operator action rather makes it possible to skip multiple entries in order to reach the desired entry more quickly.

The first operator action may include steering a movement of a list entry in a first direction and the second operator action may include steering a movement of a list entry in a second direction, which differs from the first direction. The second direction runs in particular substantially perpendicular to the first direction. For example, a list entry may be moved by the operator action in the horizontal direction in order to scroll through the individual list entries. In this case, a vertical movement of the list entry has the result that multiple list entries are skipped so as to reach a list entry that was not yet displayed when the respective list entry was moved in the vertical direction. Of course, any other directional combinations are possible for the two operator actions as long as the two directions for the operator actions differ.

The entries of the list may be divided into classes. In this case, the second operator action takes one to a list entry of another class. The classes in particular also form a list, the individual classes including sorted list entries. In this case, the second operator action preferably takes one to the first list entry of the next or previous class. An example of such a class division is an alphabetical sorting of list entries. A class in this case includes all list entries beginning with a particular letter.

The first operator action is in particular used to scroll through the list. The second operator action may be used to abbreviate the scrolling by skipping multiple list entries.

At least one operator action may include a movement on touch-sensitive surface of an input device. Many other operator actions are possible, however, which substantially depend on the type of input device. If the input device allows for so-called gesture detection, then the operator action may include a gesture performed by the hand of a user. If the input device is a mechanical operating element, then the operator action is to actuate this operating element, e.g. to turn it or to press on it for a certain time.

The touch-sensitive surface of the input device may be provided on the display area. The entries of the portion of the list may be displayed in a one-dimensional line on the display area. The first operator action in this case may include a movement on the touch-sensitive surface, which runs substantially in the direction of the one-dimensional line. The second operator action may include a movement on the touch-sensitive surface, which runs substantially in a direction perpendicular to the one-dimensional line. For this purpose, it is not necessary for the movements to run exactly in the direction of the one-dimensional line or perpendicular to it. They may also run in an angular range of e.g. ±5 degrees or ±10 degrees around these directions.

If the touch-sensitive surface of the input device is provided on the display area, then the second operator action may furthermore be a movement, which starts with a touch of the touch-sensitive surface at a position, at which an entry of the portion of the list is displayed.

At least one operator action may include a movement of the display area in space, and the acceleration of the display area in space may be detected. In this case, the user moves the device, which includes the display area, e.g. in a particular direction. This movement includes an acceleration of the display area, which is detected. The direction in which a list is to be run through is derivable from the direction of movement. The movement in a different direction may be interpreted as a second operator action, in which multiple list entries are skipped.

The displayed list entries may be represented as arranged on a virtual ring or ring section represented in perspective. In this case, the first operator action rotates the displayed list entries on the virtual ring or ring section in carousel-like fashion.

Rotating should be understood as rotating the virtual ring or ring section. Since the three-dimensional virtual ring on the display is represented in a two-dimensional perspective view, the objects are actually shifted with respect to their position on the display.

In a device according to example embodiments of the present invention for displaying information, the user is able to actuate the operating device by a second operator action, by which multiple list entries are skipped in order to arrive at a list entry that is not contained in the displayed portion of list entries that were displayed while performing the second operator action.

The device may be able to implement the method steps described above partially or entirely.

The operating device of the display device may include a user interface device and an input device. As a function of an input via the input device, the user interface device is able to produce graphic data, which control the display device such that a particular display is represented on the display area. For changing the graphic data, for example for producing an animation, the user interface device may include a computing unit, which produces graphic data for intermediate images for the animation. It is also possible, however, for these intermediate images to be already stored in advance in the memory.

The first or second operator action, which is implemented by the operating device of the device into a change of the display on the display area, includes in particular the operator actions described above with reference to the method. For this purpose, the input device may include a touch-sensitive surface. This surface may be part of a so-called touch pad. Furthermore, the surface may be provided on the display area, i.e. the display device is equipped with a touch screen. Moreover, the input device may be a device for detecting and evaluating a gesture of a part of the body of a user, which is performed in front of the display area. For this purpose, the input device may include in particular a receiving device, to which a signal from the body part of the user may be transmitted capacitively when the body part is in proximity of the receiving device. The position of the body part may be detected via this capacitive coupling. From the change of this position over time, a gesture of the user may be inferred.

Furthermore, the input device may include an infrared light source or a receiver for reflected infrared light for detecting the gesture of the body part of the user. In this case as well, the position of the body part and its change over time are detected and interpreted as a gesture.

Furthermore, an approach sensor may be provided, which detects the operating intention of a user on the basis of the approach of a part of the body of the user.

Furthermore, the device may include an acceleration sensor, which is able to detect the acceleration of the display area in space. The operating device is able to interpret the data detection of the acceleration sensor so as to assign it to the first or to the second operator action.

Example embodiments of the present invention are explained in more detail below with reference to the Figures.

DETAILED DESCRIPTION

An exemplary embodiment described below relates to a display device and a method for displaying information in a vehicle, in particular a motor vehicle. Example embodiments of the present invention, however, may be utilized in the same manner in a mobile or stationary consumer electronics device, in particular a device for playing back audio and video files.

Figure 1:
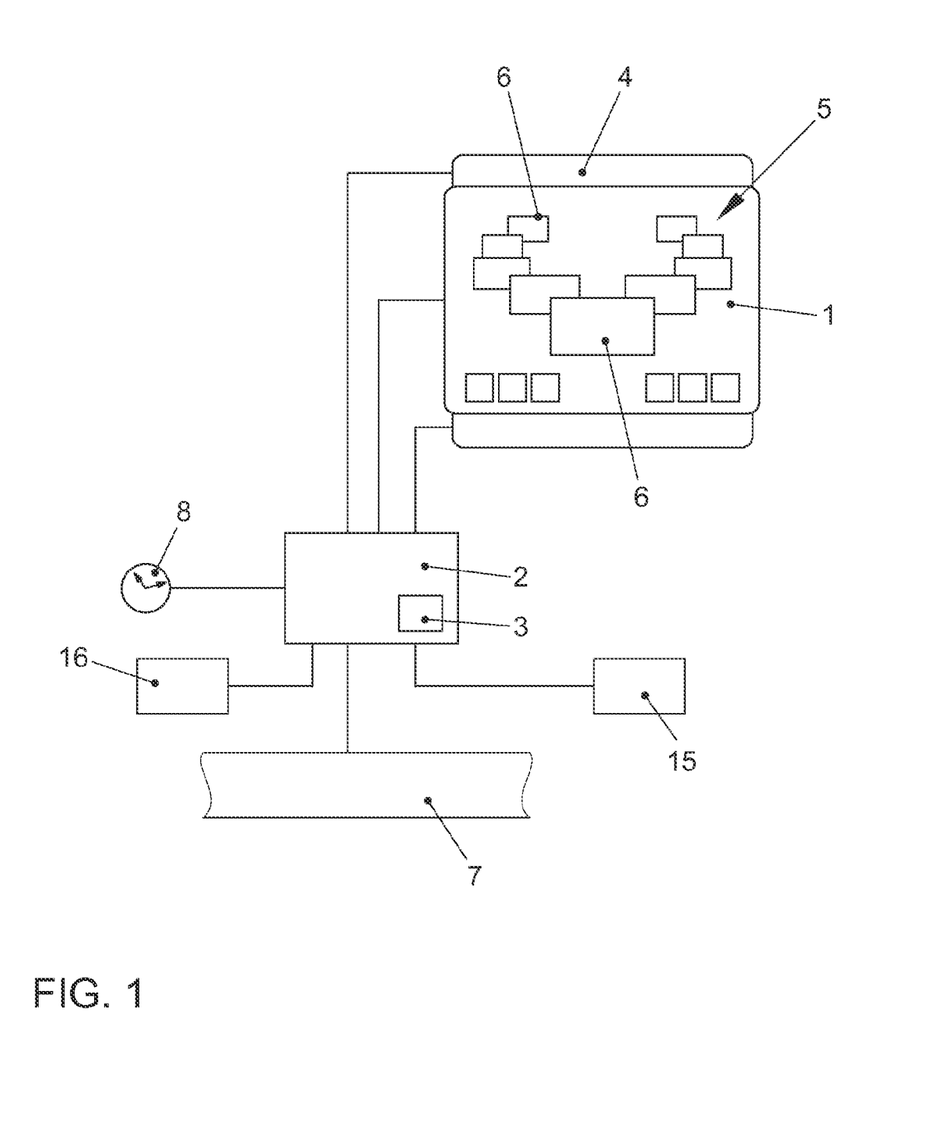
FIG. 1 schematically shows display device according to an example embodiment of the present invention and the coupling of this display device to the electronic system of a motor vehicle.

The display device includes a display 1 for the graphical representation of information on a display area. Display 1 may be a matrix display, e.g. an LCD (liquid crystal display), especially a color display using TFT (thin-film transistor) technology. Furthermore, the display may be a so-called twisted nematic-liquid crystal display (TN-LCD), a super twisted nematic (STN) display, a double-layer STN, an FLC (ferroelectric liquid crystal) display or an SSFLC (surface stabilized ferroelectric liquid crystal) display. Display 1 has an associated back-lighting (not shown), which may be provided by one or more light-emitting diodes. Display 1 is freely programmable, i.e. any desired graphic data may be produced, which are represented on display 1.

In particular, display 1 is mounted in an area of the vehicle that is clearly visible at least for the driver. If the operation of the devices of the vehicle is coupled directly to the position of display 1 such that the user must bring e.g. his hand or his finger at least near display 1 in order to make inputs, display 1 is positioned in such a way that the driver of the vehicle may reach it readily with his hand or his finger. Display 1 may be accommodated in the center console of the vehicle for example.

Display 1 is connected to a user interface device 2, which is able to produce graphic data for graphic objects 6 representable on display 1. Furthermore, user interface device 2 is connected to an input device 4, via which the user is able to control devices of the vehicle, the information of which is displayed on display 1. User interface device 2 and input device 4 form an operating device, which may be actuated by a user and which implements the input of a user in graphic data for representation on display 1.

User interface device 2 is furthermore connected to a memory 15. In particular data for a list as well as the graphic objects 6 associated with the individual list entries may be stored in this memory.

Input device 4 may be for example a device for detecting and evaluating a gesture of a part of a user's body. The hand of the user may perform the gesture in front of display 1 for example. For this purpose, the three-dimensional position of the hand is detected in a specific detection area in front of display 1, without it being necessary to touch display 1. The admissible detection area depends on the placement of display 1 in the motor vehicle. The area should be selected such that the presence of the hand of a user in this detection area may be associated unequivocally with an operative control of input device 4. The boundary of the detection area may be e.g. 40 cm to 10 cm in front of display 1. If the hand of the user is brought up closer than this threshold value to display 1, this is detected by input device 4 or by a separate approach sensor, and the approach is interpreted as an operating intention. For instance, this may result in a change in the manner in which the objects represented on display 1 are rendered. Input device 4 detects the position and the movement of the hand of the user in the detection area. In the process, various gestures performed by the hand are recognized and interpreted as inputs.

Input device 4 may include e.g. infrared light sources and infrared light receivers, which detect the infrared light reflected by the hand. Details of such an input device are described in German Patent Document No. 100 58 244 which is incorporated herein by reference. Further input devices, which may be used in conjunction with the display device, are described in the following publications: German Patent Document No. 103 05 341 and German Patent Document No. 10 2004 048 956.

Furthermore, the position of the hand and its change over time may also be detected by an optical system. In this system, a light-emitting diode emits e.g. square-wave, amplitude-modulated light. This light is reflected by the object to be detected, i.e. the hand, and after the reflection reaches a photodiode. Another light-emitting diode likewise emits square-wave, amplitude-modulated light to the photodiode, which light is phase-shifted by 180° however. At the photodiode, the two light signals are superposed and cancel each other out if they have exactly the same amplitude. If the signals do not cancel each other out at the photodiode, the light emission of the second diode is regulated via a control loop such that the total received signal again adds up to zero. If the position of the object changes, this also causes a change in the light component which arrives at the photodiode from the first light-emitting diode via the reflection on the object. This brings about a correction of the intensity of the second light-emitting diode through the control loop. The control signal is therefore a measure for the reflection of the light, which is emitted by the first diode, on the object. In this manner, it is possible to derive from the control signal a signal that is characteristic for the position of the object.

In addition, the input device may be a touch-sensitive film, which is provided on display 1. The film makes it possible to detect the position at which the user touches display 1 situated behind the film. The film may be arranged e.g. as a resistive touch film, a capacitive touch film or piezoelectric film. Furthermore, the film may be arranged so as to measure a heat flow emanating e.g. from the finger of a user. Various inputs may be obtained from the development of the touch of the film over time. In the simplest case, for example, a touch of the film at a specific position may be allocated to a graphic object shown on display 1. Furthermore, sliding movements of the finger over the film may be interpreted. In particular, in this manner the user is able to define a line on display 1, in that he touches the film at one point, slides on the film toward another point and removes the finger from the film at the other point.

Finally, a separate operating element may be used as input device. In particular, the separate operating element is a mechanical operating element. For instance, a rotary switch may be provided, by which objects shown on the display are controllable and are selectable by pressing the rotary switch. Furthermore, an angle of rotation may also be input directly by the rotary switch, as will be explained later. In addition, separate press switches may be disposed around the rotary switch, the arrangement of display fields on the display, which are associated with the press switches, corresponding at least schematically to the arrangement of the press switches. The informational system may include a multi-function operating device as described in European Patent Document No. 1 212 208 for example.

User interface device 2 is further coupled to a system clock 8 and if applicable to a vehicle bus 7. User interface device 2 may be connected e.g. to driver assistance systems of the vehicle via vehicle bus 7. User interface device 2 receives data from these driver assistance systems via vehicle bus 7, and processes these data so that they are displayed graphically to the driver or the vehicle occupants via display 1. To this end, user interface device 2 produces graphic data for objects displayable on display 1, which, inter alia, graphically represent the information of the driver assistance systems. User interface device 2 is furthermore connected via vehicle bus 7 to various information, communication and entertainment devices of the vehicle. The varied information from these devices of the vehicle is processed in user interface device 2 and converted into graphic data for a graphical representation. For animations of the graphical representation on the display, the user interface device includes a computing unit 3, which accesses system clock 8 in producing intermediate images.

In the following, the display of information on display 1 in the vehicle is explained in detail:

The graphic data, which user interface device 2 produces for display 1, relate to a portion of a list. Multiple entries from this list are represented as objects arranged on a virtual ring section 5 shown in perspective. The perspective representation shows virtual ring section 5 as though the observer were looking at an angle from above onto ring section 5. An object 6 in the foreground is shown as the largest in the perspective view. Further back, additional objects 6 are shown, partially hidden by objects 6 situated in front of them. One or more devices of the vehicle are assigned to objects 6 or to the associated list entries. Objects 6 shown in FIG. 2 either give only an indication of the associated vehicle device or additionally already provide informational content of this device.

Figure 2:
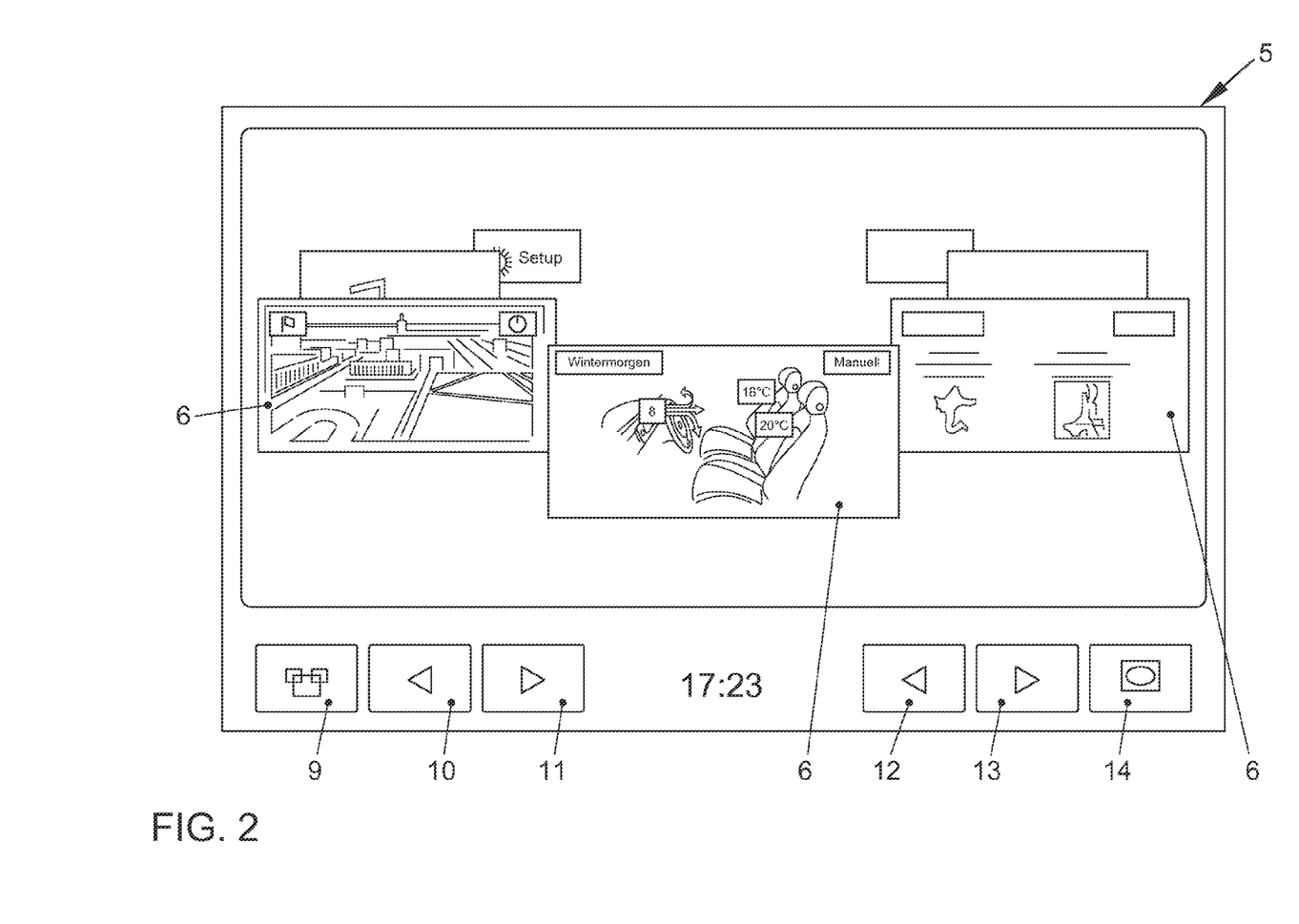
FIG. 2 shows a display of information produced by the method according to an example embodiment of the present invention in a motor vehicle, in which multiple objects are represented.

In the view shown in FIG. 2, object 6 represented in the foreground refers to the control of the air conditioning of the interior of the vehicle. The object adjacent to the right and behind this object 6 is assigned to the music playback device of the vehicle, and the object adjacent to the left of object 6 associated with the air-conditioning control is assigned to the navigation system of the vehicle. An object situated further back relates to the settings of the display device itself.

Below the virtual ring section 5 shown in perspective are buttons for controlling the graphic data produced by user interface device 2 for display 1. Using a first button 9, the user is able to return in any display state to the initial state, in which objects 6 are displayed as situated on the virtual ring section 5 shown in perspective. Using buttons 10 and 11, objects 6 on virtual ring section 5 may be rotated in carousel-like fashion by a position clockwise or counterclockwise, as will be explained later in detail. Buttons 12 and 13 may be used to actuate functions within an object 6, and via button 14 the user is able to access e.g. directly the settings menu for the graphics.

Starting from the view of display 1 shown in FIG. 2, any of the objects 6 shown on virtual ring section 5 may be selected and activated using input device 4. If the input device includes a touch-sensitive film, the user can tap e.g. using his finger on the object 6 to be activated. If input device 4 detects e.g. the position of the finger or the hand of the user in front of display 1, it suffices for the user to bring his finger near the position of display 1, at which the object 6 to be activated is represented. If an object 6 has been activated with the aid of input device 4, then in a smooth transition, virtual ring section 5 with the objects 6 situated on it is faded out and only activated object 6 is still represented. When virtual ring section 5 and objects 6 situated upon it are faded out until solely the activated object 6 is shown, activated object 6 displaces the other objects 6 of ring section 5 and is enlarged continuously until only activated object 6 is still displayed. The graphic data for this smooth transition are calculated by the user interface device 2. When producing the intermediate images, user interface device 2 uses system time 8 in order to ensure that the animation is reproduced smoothly without jerky movements.

Figure 3:
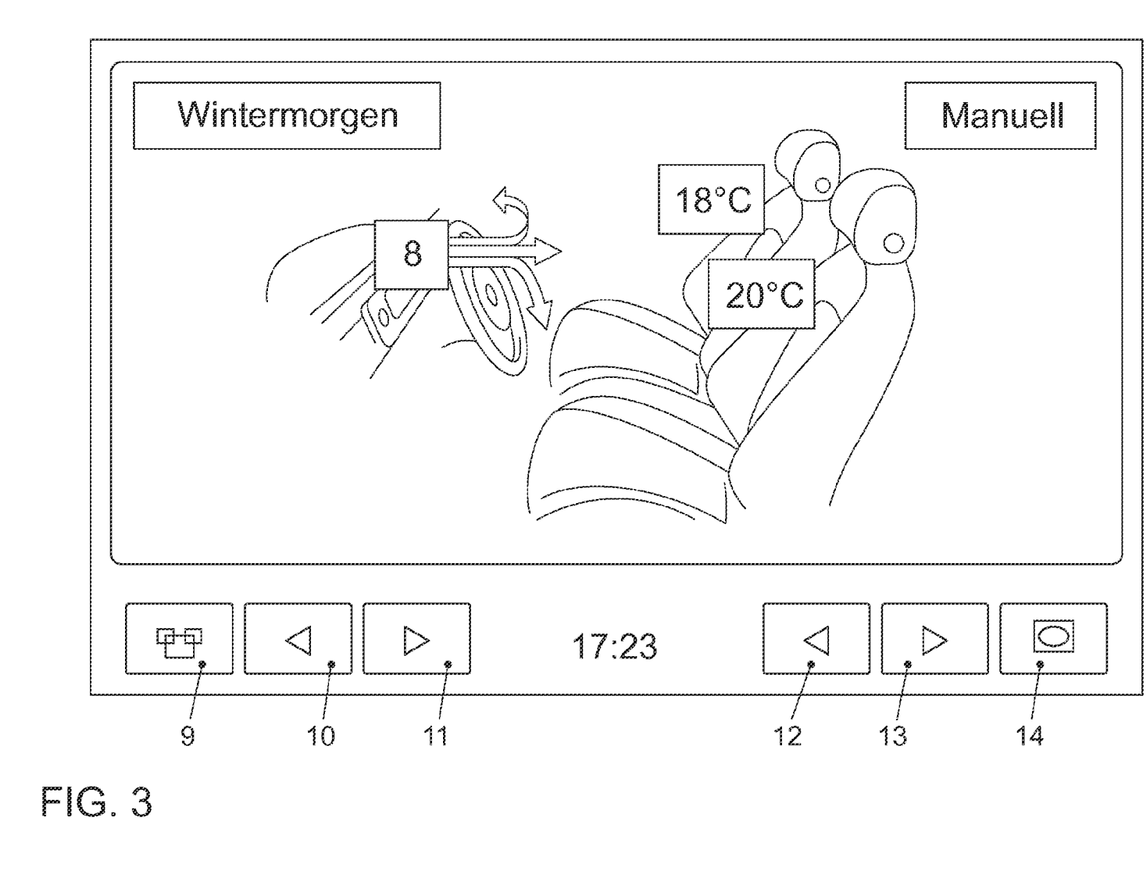
FIG. 3 shows a display of information of an activated object produced by the method according to an example embodiment of the present invention.

FIG. 3 for example shows a view of display 1, which is shown when activating the object 6 associated with the air conditioning. In this case, the representation of object 6 for the air conditioning shown in FIG. 2 is magnified. Buttons 9 through 14 are preserved in the process. If the user actuates button 9 from this view shown in FIG. 3, then the representation of object 6 for the air conditioning is continuously scaled down, and the other objects 6 of virtual ring section 5 appear again, until the view shown in FIG. 2 is displayed.

If, on the other hand, button 10 or 11 is actuated, object 6 for the air conditioning is similarly scaled down and the other objects 6 of virtual ring section 5 are displayed again as shown in FIG. 2. Subsequently, however, virtual ring section 5 is rotated clockwise or counterclockwise in carousel-like fashion to the next position, whereupon the next object 6 now positioned in the foreground is activated and in a smooth transition is shown enlarged and as displacing the other objects 6, until only this next object 6 is displayed.

Figure 4:
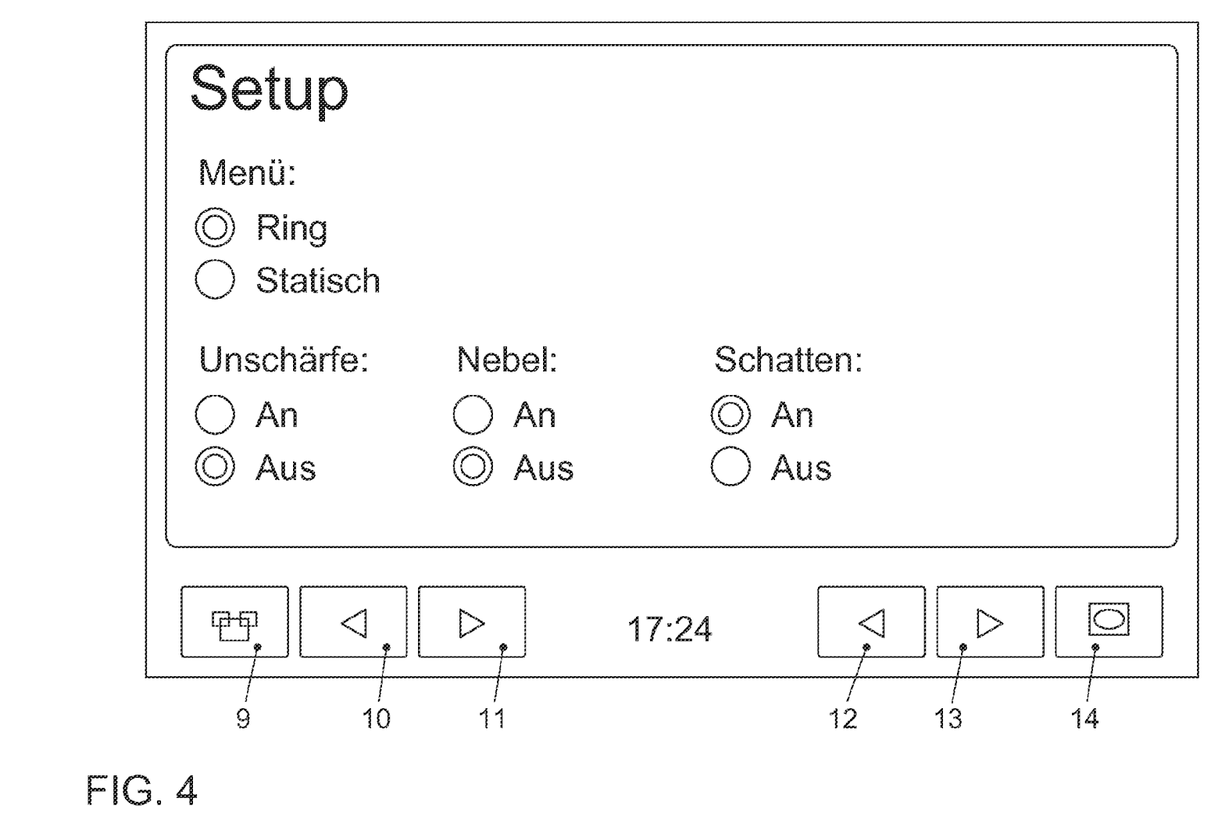
FIG. 4 shows a display of information of another object produced by the method according to an example embodiment of the present invention.

FIG. 4 shows object 6 associated with the settings of the graphics system itself. When activating this object 6, various settings may be adjusted for the graphic display using input device 4.

The list entries, to which graphic objects 6 belong, are part of a hierarchical structure, as described above, since the activation of a list entry or a graphic object 6 results in the display of more detailed information. Furthermore, the activation of a graphic object 6 or a list entry may result e.g. in the playback of an audio file. In this case too, the playback of the audio file corresponds to a lower level of the hierarchy. When displaying such a hierarchically organized data set, the transition between two static representations on display 1 is of particular importance. Particularly if the display device is installed in a motor vehicle, it is very important that the driver of the motor vehicle in particular is able to detect the information represented on display 1 quickly, simply and intuitively, even if he directs his eyes onto display 1 only for brief intervals. For this purpose it is particularly important that the viewer is at all times able to orient himself well within the hierarchical structure. It has been shown that abrupt changes of displayed images are disadvantageous for this purpose. It has been shown in particular that smooth transitions between two static representations, in which intermediate images are displayed, which emphasize the transition between the two static representations, facilitate orientation within the structure as well as the grasp of the informational content.

Furthermore, it is particularly important how the intermediate images visualize the transition between two static representations. In this regard, a linear transition from one static representation to the next static representation is not suitable for use in a motor vehicle. Rather, intermediate images are advantageous, which illustrate a movement of objects 6 that is at least partially slowed down. The parameters for the choice of the slowdown and the duration of the transition must also be adapted for use in the vehicle because conventional animations known from the field of computers are usually not usable.

The following describes in detail how the user is able to rotate the objects 6 situated on virtual ring section 5 in carousel-like fashion on this virtual ring section 5 with the aid of input device 4.

The starting point of the rotation is the arrangement of objects 6 on virtual ring section 5 shown in FIG. 2. Objects 6 are thus represented on a ring-shaped one-dimensional line. By a first operator action via input device 4, the user now specifies the total rotational angle $\alpha_{Rotation}$, by which objects 6 are to be rotated on the ring as a whole, of which only a ring section 5 is shown. For this purpose, the user enters a line on display 1 using input device 4 for example. If input device 4 includes a touch-sensitive film, the user may run his finger over the film in order to specify this line. This line for entering the first operator action runs in particular substantially on the line on which objects 6 are represented, or parallel to this line. If input device 4 is able to detect a gesture of the user or a movement of his hand or his finger in front of display 1, the line is entered in this manner. If the line is not oriented in the direction of the width of display 1, but rather runs aslant, preferably only the length of the horizontal component of the entered line oriented in parallel to the width of display 1 is used, as long as the deviation from the horizontal does not exceed 45°. The total rotational angle $\alpha_{Rotation}$ is calculated from the ratio of the length of this horizontal component of the line to the total width of display 1. In fact, in the perspective view on display 1, objects 6 are shifted only in the plane of display 1. Rotational angle $\alpha$ is thus transformed accordingly by user interface device 2 when producing the graphic data.

If input device 4 is a separate operating element having a rotary encoder, then the total rotational angle may also be input via the rotational angle of the rotary encoder.

Since only a portion of the list is shown on display 1, the shown portion changes as the virtual ring is rotated. In the rotation, objects 6 disappear on the one side of ring section 5, while new objects 6 are displayed on the other side of ring section 5, which belong to list entries that were originally not displayed. In this manner, the first operator action may be used to run through the entries of the list consecutively, the entries of the list being shown on the basis of graphic objects 6.

After the total rotational angle $\alpha_{Rotation}$ has been entered by the user with the aid of input device 4, a computing unit 3 of user interface device 2 produces an animation, which includes the graphic data for successive intermediate images, which represent successive rotational angles $\alpha$ for objects 6. The transition from the initial state having an initial angle of the objects to a final state, in which the objects have been rotated by total angle $\alpha_{Rotation}$, occurs by a decelerated movement, which is calculated by the following steps:

$$n = \frac{t}{d} - 1; \quad \text{(i)}$$

$$\alpha = b + \alpha_{Rotation} \cdot (1 - n^4). \quad \text{(ii)}$$

In this instance, t is the system time, which computing unit 3 retrieves from system clock 8. At the start of the rotation, the system time is zero. In the final state of the rotation, system time t corresponds to the duration d of the total rotation about total angle=angle×rotation. Steps (i) and (ii) are repeated until system time t is greater than the duration d of the total rotation.

Figure 5:
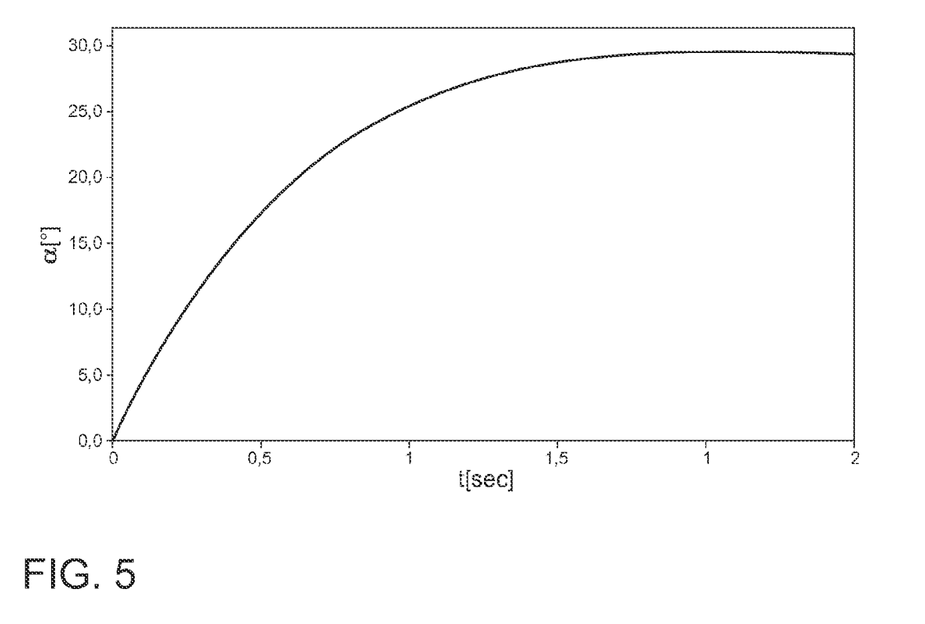
FIG. 5 shows the time characteristic of the rotational angle of an object when rotating on the virtual ring.

FIG. 5 shows the time characteristic of rotational angle $\alpha$ for the intermediate images if an object 6 is rotated by a total rotational angle $\alpha_{Rotation}$ of 30° in 2.5 seconds. It can be seen that the rotational speed is initially relatively fast and is then slowed down.

In the present exemplary embodiment, the total rotational angle $\alpha_{Rotation}$ is additionally adapted to a rotational angle, which corresponds to a carousel-like rotation of objects 6 on virtual ring section 5, at which in the final state an object 6 appears in the foreground, as shown in FIG. 2. The rotational angle input by the user via input device 4 is thus rounded up or down to these discrete rotational angles.

If an object is rotated into the foreground by the user via input device 4, this object 6 is automatically activated after the expiration of a time interval. Following the expiration of the time interval, this object 6 is thus magnified, while at the same time the virtual ring section 5 with the other objects 6 vanishes until only the activated object 6 is still displayed.

The data of the speedometer of the motor vehicle may be transmitted to user interface device 2 and thus computing unit 3 via vehicle bus 7. These data are used by computing unit 3 to ascertain the duration of the rotation. The higher the speed of the motor vehicle, the longer is the duration of the total rotation.

Furthermore, a second operator action may be performed in the method described herein or the device described herein. In this operator action, the user performs an operator movement that differs from the operator movement of the first operator action. In the present case, a vertical operator movement upward or downward is performed. For example, the user may move the finger upward or downward on the touch-sensitive surface. The second operator movement in particular starts with a touch of the touch-sensitive surface at a position at which an object 6, i.e. an entry of the portion of the list, is displayed. Thus, for the second operator action—in contrast to conventional systems—it is not necessary to display e.g. a separate index in order to skip list entries. It suffices to perform an operator movement that has a direction of movement that is clearly distinguished from the direction of movement of the first operator movement. Furthermore, the user may perform a corresponding gesture in front of display area 1. Finally, it is possible for the user to actuate corresponding mechanical operating elements for controlling the movement of an object 6 in a corresponding direction.

The second operator action has the consequence that user interface device 2 changes the graphic data in such a way that multiple list entries are skipped in the display of the portion of the list so as to reach a list entry, which, or the associated graphic object 6 of which, is not contained in the displayed portion of the list entries that were displayed while performing the second operator action. Following the execution of the second operator action, a graphic object 6 is thus displayed in the foreground, which was previously not displayed. The total ring with the list entries was transported directly into a rotated state, in which another portion of the list is shown, without it having been necessary to run through the individual list entries consecutively.

Figure 6:
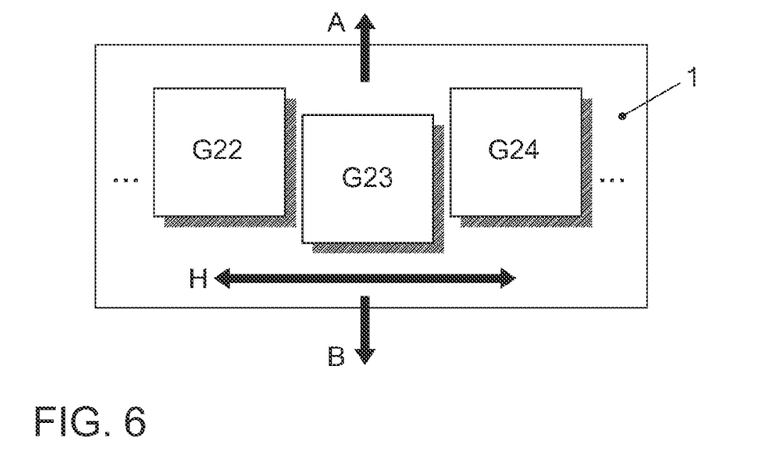
FIGS. 6 through 8 show the change of the displayed list entries in a second operator action.
Figure 7:
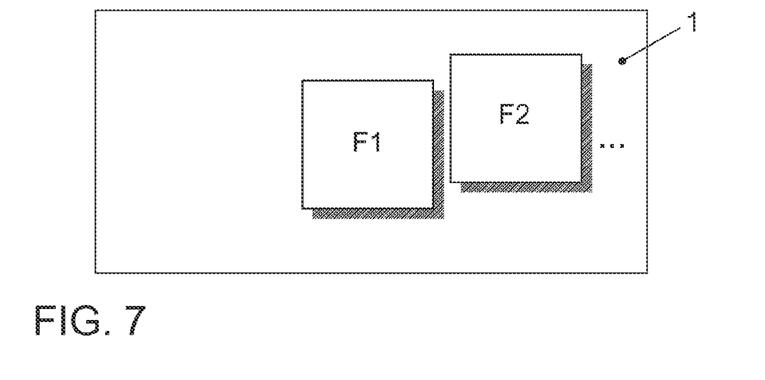

The second operator action is explained in detail in the following with reference to FIGS. 6 through 8:

The starting point is the display of a portion of a list on the display area of display 1, as it is represented in FIG. 6. This informational display substantially corresponds to the informational display represented in FIG. 2 of the list entries on the basis of graphic objects 6. In the state shown in FIG. 6, three list entries G22, G23, and G24 are shown by way of example.

The entries of this list are divided into classes, the individual classes in turn forming a list. In the present case, this may be an alphabetic sorting of concepts associated with the list entries for example. In this case, list entries G22, G23 and G24 are the entries no. 22 through 24 beginning with the letter G. The list entries having other initial letters are sorted accordingly.

By a first operator action, as explained above, the user is now able to bring about a change in the displayed list entries by an operator movement in the direction of double-arrow H. If he moves the finger on the touch-sensitive surface to the left for example, the displayed portion of the list will move to the left as well such that list entries on the left side disappear, while new list entries emerge on the right side. Accordingly, when performing an operator movement to the right, list entries on the right side disappear, while new list entries emerge on the left side.

In the second operator action, the user may perform a movement upward in the direction of arrow A or downward in the direction of arrow B. An operator action upward in the direction of arrow A has the consequence that the displayed portion of the list entries is changed immediately such that multiple list entries are skipped and the first list entry of the next initial letter is reached, i.e. as shown in FIG. 7, list entry F1. Furthermore, the displayed portion of the list may change such that the last list entry or the last entries beginning with the letter G is or are not included in the displayed portion.

Figure 8:
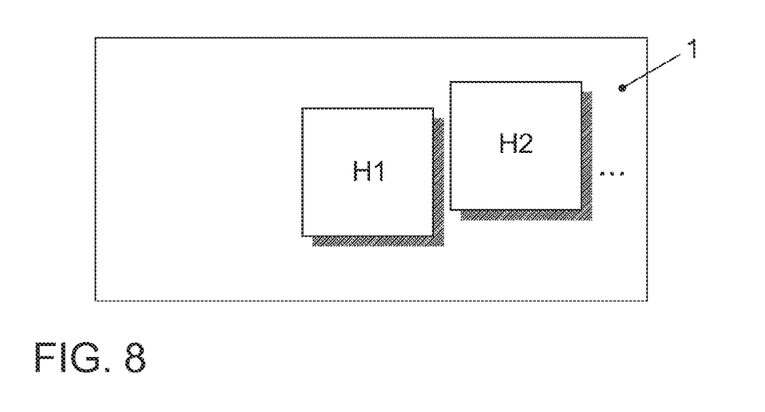

If the second operator action by contrast includes an operator movement downward in the direction of arrow B, the first list entry beginning with the next lower initial letter is reached directly, i.e. as shown in FIG. 8, list entry H1. A portion of the list is thus displayed, which begins with the list entry H1 and thereupon shows additional list entries beginning with the letter H.

User interface device 2 may furthermore be coupled to an acceleration sensor 16, which, alternatively or additionally, may be used as an input device. Acceleration sensor 16 is able to detect an acceleration of the device, which in this case is arranged in particular as a mobile device, as well as the direction of acceleration. A movement of the device, including display area 1, in space corresponds in this case to the previously explained movement on the touch-sensitive surface of display area 1. In this case, a movement to the left makes it possible to scroll through the list in one direction for example, while a movement to the right makes it possible to scroll through the list in the other direction. An upward movement results in multiple list entries being skipped forward in the list, while a movement downward results in multiple list entries being skipped backward, as was explained above.

LIST OF REFERENCE NUMERALS 1 display
2 user interface device
3 computing unit
4 input device
5 virtual ring section
6 graphic objects
7 vehicle bus
8 system clock
9-14 buttons of an object 6
15 memory
16 acceleration sensor

The invention claimed is:

1. A method for displaying information, comprising:
    displaying, on a display area, a portion of a list including a plurality of list entries divided into a plurality of classes, wherein each class is associated with a letter, the displayed list entries being a part of a first class associated with a first letter;
    changing the displayed portion of the list by a first operator action of a user including selecting a list entry and steering a movement of the selected list entry in a first direction;
    consecutively running through the entries of the list by the first operator action; and
    skipping multiple list entries by a second operator action including steering a movement of a list entry in a second direction different from the first direction, to reach a first list entry of a second class associated with a second letter, wherein the first list entry of the second class is displayed in the center of the display area;
    wherein the first list entry of the second class is not included in the displayed portion of the list entries displayed while performing the second operator action; and
    wherein at least one operator action includes a movement on a touch-sensitive surface of an input device arranged on the display area, the list entries of the portion of the list are displayed in a one-dimensional line on the display area, the first operator action includes a movement on the touch-sensitive surface substantially in a direction of the one-dimensional line, and the second operator action includes a movement on the touch-sensitive surface substantially in a direction perpendicular to the one-dimensional line.

2. The method according to claim 1, wherein the entries of each class are sorted alphabetically when displayed on the display area.

3. The method according to claim 1, further comprising scrolling through the list by the first operator action.

4. The method according to claim 1, wherein the touch-sensitive surface of the input device is arranged on the display area, and the second operator action includes a movement that starts with a touch of the touch-sensitive surface at a position at which a list entry of the portion of the list is displayed.

5. The method according to claim 1, wherein at least one operator action includes a movement of the display area in space, the method further comprising detecting an acceleration of the display area in space.

6. The method according to claim 1, wherein the displayed list entries are represented as situated on at least one of (a) a virtual ring and (b) a virtual ring section shown in perspective, and the displayed list entries on the at least one of (a) the virtual ring and (b) the virtual ring section are rotated in carousel-like fashion by the first operator action.

7. A device for displaying information, comprising:
    a display device having a display area;
    a memory adapted to store a list that includes a plurality of list entries divided into a plurality of classes, wherein each class is associated with a letter, the displayed list entries being a part of a first class associated with a first letter, a portion of the list displayable on the display area; and
    an operating device operable by a user to change the displayed portion of the list by a first operator action including selecting a list entry and steering a movement of the selected list entry in a first direction, the entries of the list being run through consecutively in response to the first operator action, the operating device operable by the user by a second operator action including steering a movement of a list entry in a second direction different from the first direction, in response to the second operator action multiple list entries are skipped to reach a first list entry of a second class associated with a second letter, wherein the first list entry of the second class is displayed in the center of the display area; and wherein the first list entry of the second class is not included in the displayed portion of the list entries displayed while performing the second operator action; and wherein at least one operator action includes a movement on a touch-sensitive surface of an input device arranged on the display area, the list entries of the portion of the list are displayed in a one-dimensional line on the display area, the first operator action includes a movement on the touch-sensitive surface substantially in a direction of the one-dimensional line, and the second operator action includes a movement on the touch-sensitive surface substantially in a direction perpendicular to the one-dimensional line.

8. The device according to claim 7, wherein the operating device includes an input device having a touch-sensitive surface.

9. The device according to claim 7, wherein the device includes an acceleration sensor adapted to detect an acceleration of the display area in space.

* * * * *